Patented Oct. 17, 1933

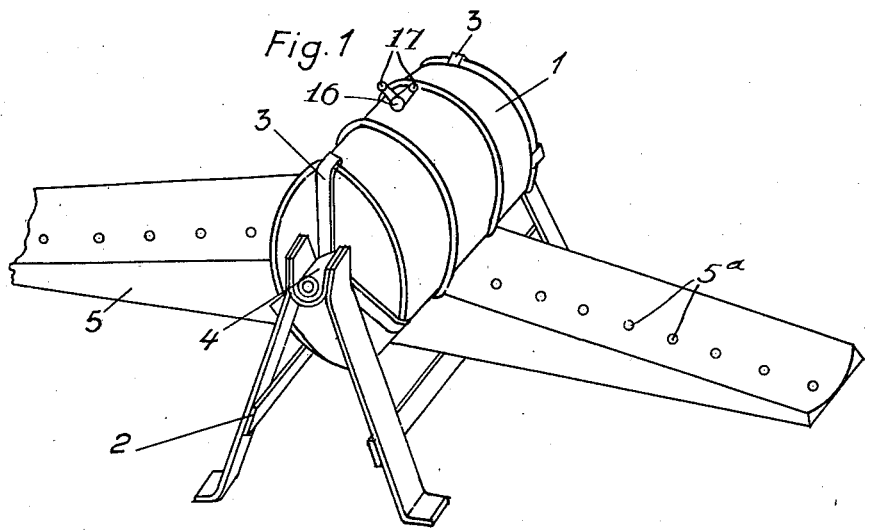
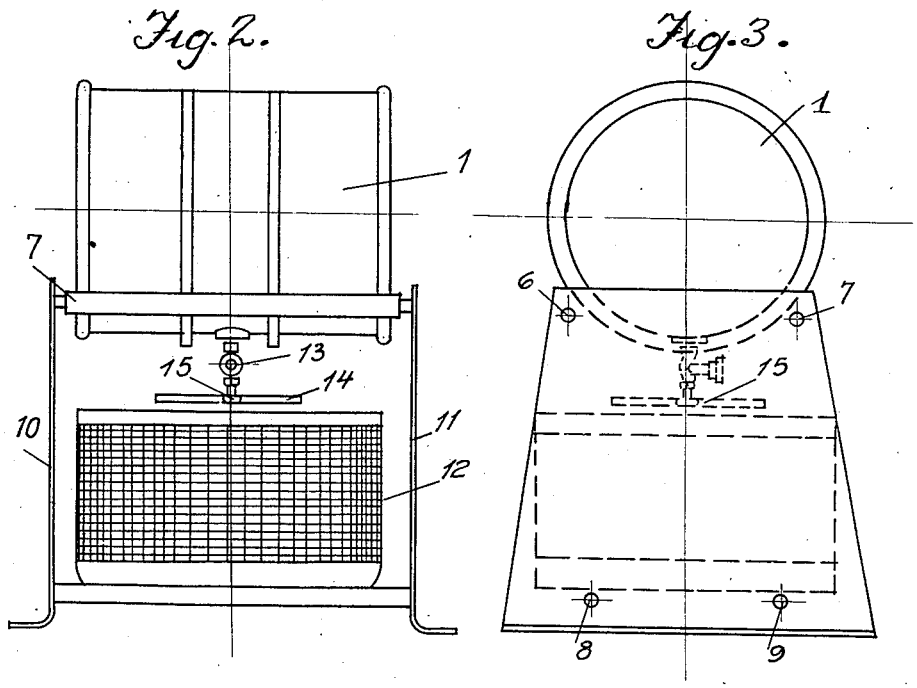
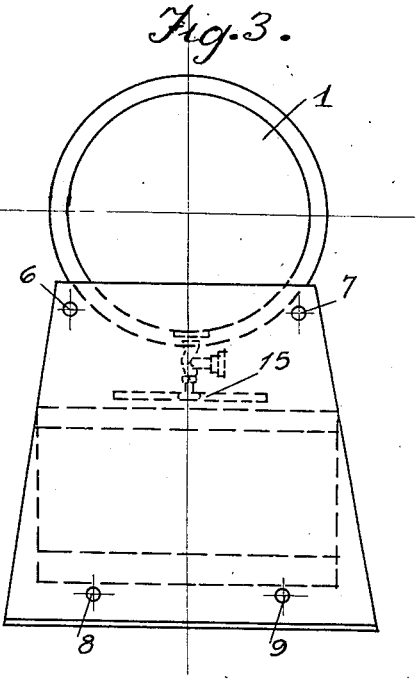

1,930,904

UNITED STATES PATENT OFFICE 1,930,904

PROCEDURE AND DEVICE FOR THE PROTECTION OF PLANTS FROM FROST AND FOR THE REPRESSION OF VERMIN BY ARTIFICIAL FOG

Ulrich Müller, Kiel, Germany

Application April 11, 1931, Serial No. 529,530, and in Germany August 2, 1930

8 Claims. (Cl. 47—2)

The protection of growing plants from destruction by night frosts in Spring has been known for a long time. Many plans of operation have been tried for this purpose, but have proved more or less complicated and expensive in their application as well as only partly effective. Frost-protection by means of linen covers or mats is known. These covers or mats, being spread over the exposed plants, are to form an obstacle for the heat rays radiating from the soil. It is obvious that such form of protection is very expensive and requires employing a large number of hands, and even then is only applicable for very small cultivated surfaces. The generation of heat in such plant-cultivation by means of stoves or briquettes is subject to similar objections, requiring expensive and difficult attendance and offering a very small effective protection. The procedure of smoking out the frost presents much greater possibilities, and is based on laying a dense smoke screen over the surfaces to be protected during the periods of frost menace. The dense smoke is generated with stoves by burning materials which develop smoke densely, such as crude naphthalene, and prevents, as an artificial cloud screen, the high radiation of heat from the soil. A disadvantage of this procedure, however, lies in the high costs, which hinder a wide application of the apparatus pertaining to it, and it is consequently only applicable for the protection of high class cultivations. The manipulation of the apparatus is also very expensive, as a large number of trained hands is necessary. Another disadvantage of smoking the frost consists in the fact that the smoke screen, by incomplete combustion of the materials developing smoke, carries soot particles along, which are deposited on the plants, and affect their respiratory action. On account of the rising heat resulting from the combustion, undesirable air movements are caused. Cold air currents enter from the side, and the inconstancy of the smoke clouds arising from this makes the desired protection from frost ineffective.

The various disadvantages in the prior suggestions for the protection of plants from destruction by night frosts are avoided by the procedure and the apparatus of the present invention.

According to the invention a screen of artificial fog is spread over the plants instead of the smoke screen, which then forms an effective protection against the heat radiation. The artificial fog may be produced, for example, in the known manner by spraying materials forming dense fog, for example fog acid, in finely distributed form or allowing it to drip on large surface bodies. As fog acid sulphur trioxide, chloro-sulfo acid, sulphur trioxide dissolved in chloro-sulfo acid, etc., can, for example, be employed as answering the purpose. Detailed experiments have shown, that the fog formed by the evaporation of fog acid exercises no detrimental effects on the plants in the low concentration found in the extremely fine distribution of the fog particles. No detrimental deposits whatever on the plants take place by precipitation of the fog in the procedure according to the present invention, so that injury to the respiratory action, and consequently to the growth of the plants, does not occur. Besides this the fog screen is quite stable, as there is no heat source to cause rising air currents, and consequently an effective prevention of heat radiation from the soil during frost nights is made possible.

Furthermore, according to the invention, the generated fog can, besides being employed as a frost protection medium, also be used for the destruction of certain animal and vegetable parasites. It has been ascertained by detailed experiments, that the uredo, for example, cannot thrive on sour fostering soil, so that consequently, by means of the fog in very finely distributed form, an effective protection of the plant cultivations from this evil is also attained, thus naturally yielding considerably superior and more valuable returns.

According to the invention one can go still further in the employment of the artificial fog, and use the fog particles as bearers of specifically vermin-destroying materials, for example, fluor-combinations, which develop a remarkable germ-killing effect. For example fluorsulfo acid ($HFSO_3$), in which sulphur trioxide dissolves, is, according to the invention, especially qualified for this purpose. By evaporation of this mixture one succeeds in carrying fluor-combinations over extensive districts in much finer particles than is possible in the distribution of the hitherto employed powder-formed vermin-destroying mediums.

Another great advantage as compared with the hitherto employed procedure for frost protection lies, according to the invention, in the inexpensive simple apparatus with which fog is generated. As fog source, the original transport barrel, in which the fog acid is sold, may be used, and this is laid on a suitably arranged trestle at the place of employment. A drip spout projects transversely to both sides under which lime is heaped or a nozzle system is fitted directly to the discharge tap of the barrel, so that the acid can be suitably distributed over the lime poured, for example, into a box or a wire basket or over other large surface bodies in the basket. Such apparatus is made ready for use simply by fitting a filled transport barrel on a trestle, and by filling the wire basket with large surface bodies, such as lime, coke and other materials. When a night frost sets in or is threatened, the discharge cocks of the barrels are merely opened, so that the acid then flows through the nozzles or openings upon the large surface bodies, and gives rise to a dense fog formation. The apparatus does not require attendance whilst in service. The manipulation of the apparatus is thus simple and inexpensive, and can be taken care of by a few untrained hands, so that the procedure makes the protection of large plant cultivations from destruction by night frosts possible by inexpensive and simple manipulation. The number of apparatus units to be erected depends on the size of the tract of land to be screened, with due regard for the direction of the wind.

Figure 1 is a perspective view of one form of fog-producing apparatus, according to my invention, whereas Figures 2 and 3 are front and side elevations, respectively, of another embodiment of the apparatus.

1 shows the transport barrel, which lies on a trestle 2. According to Figure 1 the cask is provided at each of its two ends with a three armed clip 3, having the gudgeons 4 on which the cask can easily be rotated in the bearing of the trestle 2. Below the barrel there are the discharge spouts 5 for the fog-forming acid, projecting to each side. Below the spouts lime, for example, is heaped, on the surface of which the fog acid evaporates. Instead of the usual screw closure of the transport barrel 1, the barrel is provided with a screwed-in insert 16 having two distributing nozzles 17. When the transport barrel 1 is inverted, these nozzles deliver the acid at a definite rate into the discharge spouts 5. For better distribution of the fog acid, the spouts 5 are provided with discharge holes $5^a$ throughout their length.

In the design represented in side and front view in Figures 2 and 3, the cask 1 lies on two rollers 6 and 7 by means of which, together with two rods 8 and 9 arranged thereunder, the two iron sheets 10 and 11 are united to form a trestle. On the lower rods 8 and 9 a container 12 for lime, coke, etc., is erected, the side walls of which preferably consist of wire gauze, so that air can sweep the container from all sides. The cask 1 is laid on the rollers 6 and 7 in such a manner that the discharge cock 13 lies between the rollers, which besides enables a slight rotation of the cask, so that the cock 13 may lie over the center of the box 12. The cock 13 is preferably provided with two distribution pipes 14, 15 lying crosswise to one another and having a number of discharge holes on their lower side, so that the acid flowing from the cask 1 is distributed over the whole surface of the lime in the container 12 in order to obtain a dense fog screen.

I claim:—

1. Process for the protection of plants from frost and for combating parasites, which comprises the laying of a fog blanket over the plants by the simple volatilization of fog-forming and parasite killing material.

2. Process for the protection of plants from frost and for combating parasites, which comprises laying a fog blanket over the plants by the simple volatilization of a fog-producing acid.

3. Process for the protection of plants from frost and for combating parasites, which comprises laying a fog blanket over the plants by the simple volatilization of a fog-producing acid on bodies of large surface.

4. Process for the protection of plants from frost and for combating parasites, which comprises laying a fog blanket over the plants by the simple volatilization of fog-producing acid containing additions of parasite-destroying ingredients for which the fog particles serve as carriers.

5. Process for the protection of plants from frost and for combating parasites, which comprises laying a fog blanket over the plants by the simple volatilization of fog-producing acid mixed with a fluor-sulfo acid.

6. Apparatus for laying a fog blanket for the protection of growing plants, comprising in combination a transport container of fog-producing acid, means for discharging fog-producing acid therefrom at a controlled rate, and means associated therewith for receiving and effecting the simple volatilization of fog-producing acid as discharged from said transport container.

7. Apparatus for laying a fog blanket for the protection of growing plants, comprising in combination a trestle having a pair of connecting rods fitted with rollers to form between them a seat, a cylindrical container of fog-producing acid rotatably positioned in said seat and provided with a drainage opening, and means associated with said container to effect simple volatilization of the fog-producing acid drained therefrom.

8. Apparatus for laying a fog blanket for the protection of growing plants, comprising in combination a trestle having a pair of connecting rods fitted with rollers to form between them a seat, a cylindrical container of fog-producing acid rotatably positioned in said seat and provided with a drainage opening, and a container of bodies of large surface disposed beneath said cylindrical container and having sides permeable to air to permit the simple volatilization of fog-producing acid drained from said cylindrical container.

ULRICH MÜLLER.